(12) United States Patent
Griepenstroh et al.

(10) Patent No.: US 9,466,913 B2
(45) Date of Patent: Oct. 11, 2016

(54) CAR CHARGING CONNECTOR

(71) Applicant: Harting Electric GmbH & Co. KG, Espelkamp (DE)

(72) Inventors: Sebastian Griepenstroh, Rahden (DE); Felix Loske, Lotte (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 0 days.

(21) Appl. No.: 14/651,360

(22) PCT Filed: Oct. 21, 2013

(86) PCT No.: PCT/DE2013/100359
§ 371 (c)(1),
(2) Date: Jun. 11, 2015

(87) PCT Pub. No.: WO2014/094726
PCT Pub. Date: Jun. 26, 2014

(65) Prior Publication Data
US 2015/0318637 A1 Nov. 5, 2015

(30) Foreign Application Priority Data
Dec. 17, 2012 (DE) .......................... 10 2012 112 353

(51) Int. Cl.
*H01R 13/52* (2006.01)
*H01R 13/502* (2006.01)
*H01R 13/58* (2006.01)

(52) U.S. Cl.
CPC ...... *H01R 13/5025* (2013.01); *H01R 13/5202* (2013.01); *H01R 13/5205* (2013.01); *H01R 13/5804* (2013.01); *H01R 13/5216* (2013.01)

(58) Field of Classification Search
CPC .......... H01R 13/5025; H01R 13/5202; H01R 13/5804; H01R 13/5216; H01R 13/5205
USPC ....... 439/471, 695, 278, 281, 586–587, 604, 439/936; 29/876
See application file for complete search history.

(56) References Cited

U.S. PATENT DOCUMENTS

| 4,109,989 A | 8/1978 | Snyder, Jr. et al. |
| 5,044,986 A | 9/1991 | Baumanis |
| 6,183,275 B1* | 2/2001 | Okura ............. H01R 13/62933 439/157 |
| 6,685,496 B2* | 2/2004 | Ookura ............. H01R 13/5202 439/372 |
| 7,097,469 B2* | 8/2006 | Jacobs ................ H01R 13/502 439/246 |
| 2006/0178049 A1 | 8/2006 | Ishikawa |
| 2010/0124454 A1 | 5/2010 | Yaworski et al. |
| 2012/0315801 A1 | 12/2012 | Kwasny et al. |

FOREIGN PATENT DOCUMENTS

| DE | 2625648 | 12/1976 |
| DE | 19900201 | 5/2000 |
| DE | 60306963 | 3/2007 |
| DE | 102008054585 | 7/2010 |

(Continued)

*Primary Examiner* — Edwin A. Leon
(74) *Attorney, Agent, or Firm* — Jacobson Holman, PLLC.

(57) ABSTRACT

A plug-in connector, in particular a car charging connector, having a contact support in which at least one contact element is provided. The contact element is connected to a conductor of a connected cable. The contact support is provided in a housing of the plug-in connector and the connected cable protrudes into the housing. The plug-in connector includes a seal which seals at the same time the contact support and a section of the cable that protrudes into the housing.

8 Claims, 3 Drawing Sheets

(56) References Cited

FOREIGN PATENT DOCUMENTS

| | | |
|---|---|---|
| EP | 2362495 | 8/2011 |
| GB | 862292 | 3/1961 |
| GB | 891169 | 3/1962 |
| GB | 2370427 | 6/2002 |
| JP | H04206179 | 7/1992 |
| JP | H08-078087 | 3/1996 |
| JP | H08148219 | 6/1996 |
| JP | 2007207726 | 8/2007 |

* cited by examiner

CAR CHARGING CONNECTOR

BACKGROUND OF THE INVENTION (1) Field of the Invention

The invention relates to a plug-in connector, in particular a car charging connector. Such plug-in connectors are used in those cases where high currents have to be transmitted. This is for example the case with car charging connectors.

(2) Related Art

EP 2362495 B1 shows a car charging connector wherein the contact elements provided in the insulation insert, the conductors connected thereto and the housing are individually sealed.

Sealing a car charging connector in such a way is complex and expensive.

DE 26 25 648 A1 shows a plug-in connector having a hose-shaped seal that seals the connected cable with one end. The other end of the seal is pressed in a sealing manner against the end wall of the contact support by means of a union nut. Such a seal is not sufficiently reliable in particular in high-vibration areas of application.

BRIEF SUMMARY OF THE INVENTION

It is the object of the invention to propose a plug-in connector that can be produced in a simple and low-cost manner.

This object is achieved by means of the characterising features of claim 1.

Advantageous embodiments of the invention are indicated in the dependent claims.

The plug-in connector proposed here is intended for the permanent transmission of high currents. It is for example a car charging connector.

In the housing of the plug-in connector, a contact support is provided that has in turn provided therein at least one contact element. As a rule, in particular if this is a car charging connector, a plurality of contact elements are provided in the contact support. The contact support is frequently also referred to as an insulation insert by people skilled in the art, because it is made from an electrically non-conductive material.

Each contact element is connected to a conductor of a connected cable. In the case of two or more contact elements, a multi-core cable is connected to the plug-in connector. The features of the plug-in connector as described below can be equally applied to both one-pole (just one contact element) and multi-pole (two or more) contact elements.

The contact support substantially has a cylindrical shape with two end faces. The contact element provided in the contact support is oriented orthogonally to the end faces. The contact element and a section of the conductor connected thereto are completely located within the contact support.

The end face that is faced by the contact tip of the contact elements is also referred to as the plug-in side. The opposite end face is also referred to as the connection side.

The housing of the plug-in connector has an opening through which the connector cable protrudes into the inside of the housing. This opening is also referred to as a cable outlet opening. The cable extends up to the contact support that is provided on the other end of the housing, also on the inside thereof. The cable sheath was removed from part of the cable extending inside of the housing, so that the individual conductors can be seen.

According to the invention, the plug-in connector comprises a seal that seals at the same time the second end face of the contact support and a section of the cable protruding into the housing of the plug-in connector.

The seal is substantially formed to be hose-shaped and thus has a first end and a second end. The first end of the seal encompasses the end face of the contact support, from which the individual conductors protrude. The second end of the seal encompasses the cable protruding into the housing. The conductors connected to the contact elements are located in the area that is sealed by the seal.

The contact elements are sealed in the contact support via individual seals, so that on the plug-in side, no media such as for example dust or water (moisture) can enter into the housing.

Advantageously, the contact support comprises a circumferential collar that is located adjacent to an end face of the plug-in connector housing. In the assembled plug-in connector, one end of the seal is pressed between the collar and the end face, as a result of which a sealing function is achieved. This sealing variant is also referred to as an axial compression because the end face is pressed against the collar in an axial direction.

Alternatively, the contact support may have a circumferential groove into which the first end of the seal engages. The plug-in connector housing then exerts a force on the seal from the top, so that the seal is pressed into the groove. This variant is also referred to as a radial compression because the pressure is exerted on the seal in a radial direction.

The seal advantageously comprises an elastic material such as for example EPDM, NBR, polyurethane or a mixture of the above-mentioned materials.

One end of the seal is advantageously fixed to the part protruding into the plug-in connector housing using fixing means. The seal is for example tied around the cable sheath of the cable using a so-called cable tie, so that a sealing function is achieved.

As an alternative to the cable tie, a so-called clamping rubber may also be used. The only important thing is that the seal is pressed onto the cable shield in a radial direction.

The first end of the seal according to the invention is clamped between the contact support and the plug-in connector housing. The second end of the seal is fixed to the connected cable in a sealing manner using the fixing means described above.

In a particularly preferred embodiment of the invention, the inner space that is enclosed by the hose-shaped seal that is fixed on both sides is at least partially filled with a thermally conductive material, for example with a thermally conductive gel.

The thermally conductive gel is used to achieve an improved dissipation of the heat during high current operation. As a result, the current carrying capacity of the plug-in connector is improved.

A particularly preferred embodiment of the plug-in connector is designed in such a way that the seal is provided in the housing of the plug-in connector and that the seal at the same time encloses the connection area of the contact support and a section of the cable protruding into the housing of the plug-in connector in a sealing manner. Or in other words, one end of the seal partially encloses the contact support, namely only the contact region that is preferably delimited by the circumferential collar as mentioned above. The other end of the seal encloses part of the connected cable.

In a further preferred embodiment, the seal includes a recess. The recess includes at least one feedthrough for a cable. The recess is preferably designed for a perfect fit of an electronic component therein. The feedthrough, or the feedthroughs, is/are provided for the cable of the electronic component. The feedthroughs are designed in such a way that they enclose the cable or the cables of the electronic components in a sealing manner.

BRIEF DESCRIPTION OF THE DRAWINGS

One embodiment example of the invention is shown in the drawings and will be explained in more detail below, wherein.

DETAILED DESCRIPTION OF THE INVENTION

Figure 1:
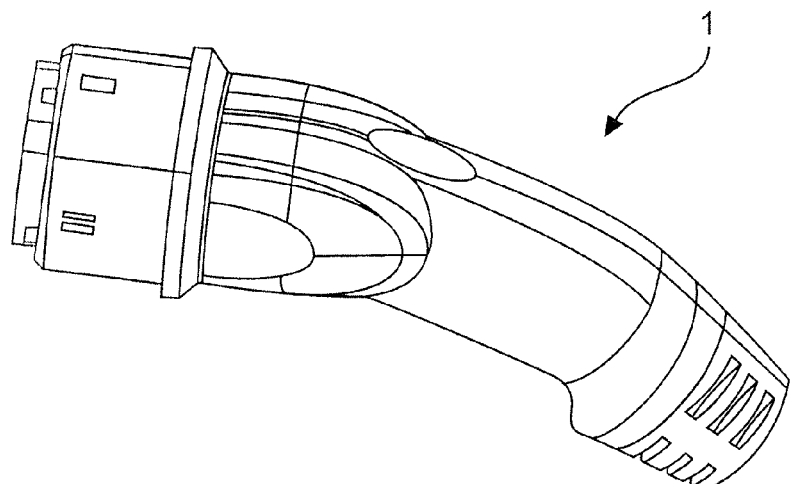
FIG. 1 shows a perspective view of a plug-in connector.

FIG. 1 shows a perspective view of a plug-in connector 1 according to the invention. This is a car charging connector used for charging an electric car.

Figure 2:
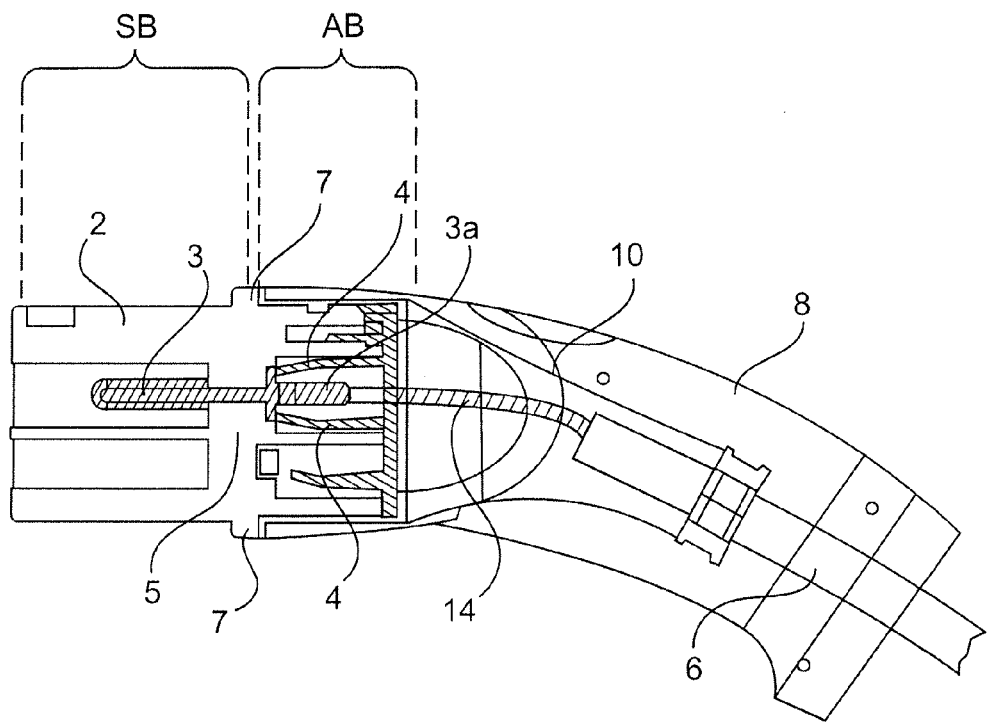
FIG. 2 shows a sectional view through the plug-in connector.
Figure 3:
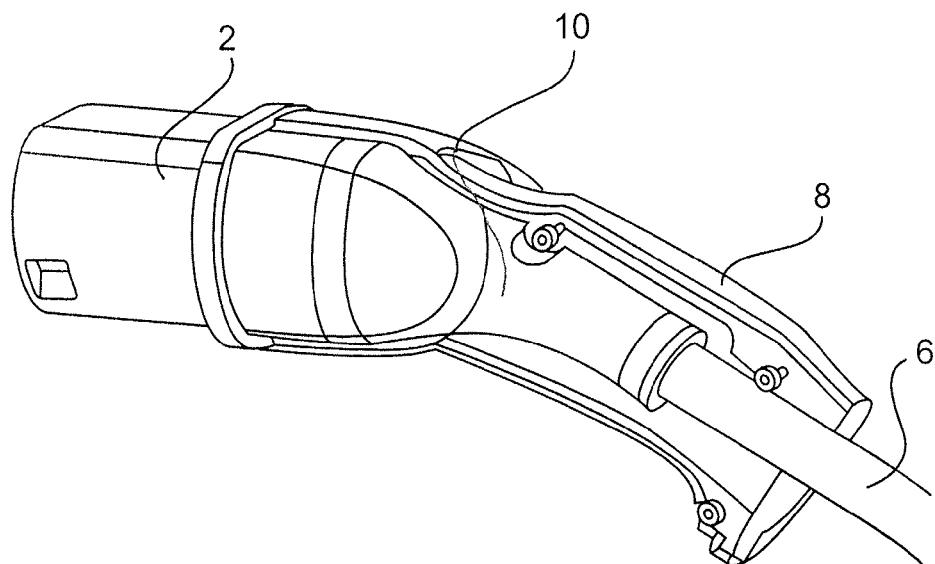
FIG. 3 shows a perspective view of the plug-in connector with an open housing.
Figure 4:
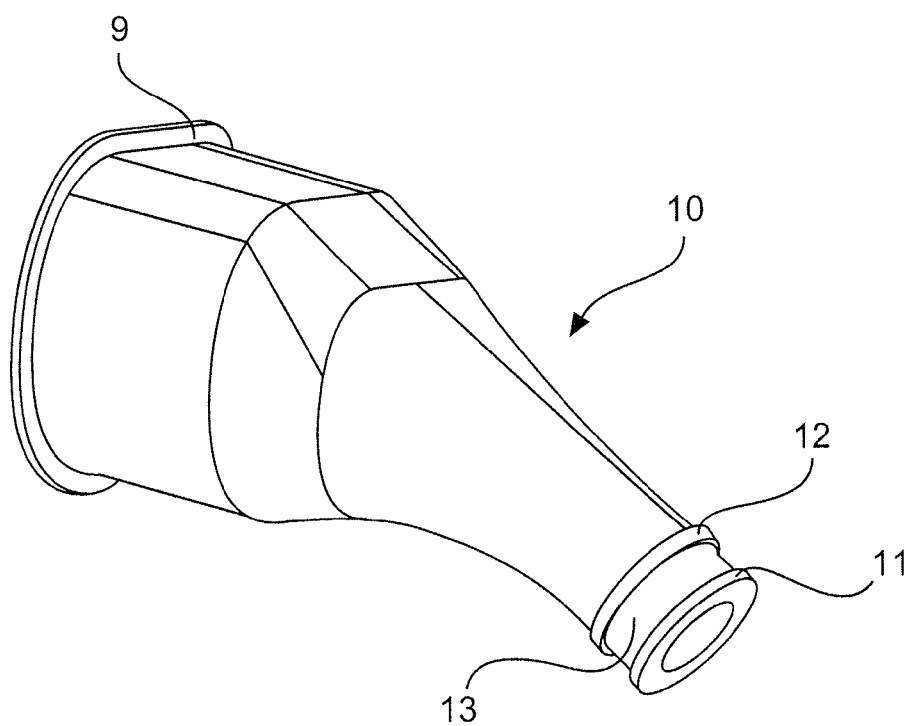
FIG. 4 shows a perspective view of a seal.

The plug-in connector 1 consists of a contact support 2, in which contact elements 3 are provided. In the sectional view in FIG. 2, only one contact element 3 can be seen. The contact support 2 comprises inwardly directed retention arms 4 which keep the contact element 3 in their position in the contact support 2.

The contact support 2 substantially has a cylindrical shape. The contact elements 2 are enclosed by a thickening 5, which has bores intended for this purpose introduced therein. In the plug-in direction, the contact support 2 forms a cavity into which the contact element 3 protrudes. In the connection direction, the contact support 2 also forms a cavity into which the connection part 3a of the contact element 3 protrudes. On the connection part 3a of the contact element 3, a conductor 14 of the multi-core cable 6 is connected. The connection part 3a may for example be implemented as a crimp connection.

The contact support 2 comprises a collar 7 that externally extends around the circumference. The circumferential collar 7 optically separates the connection area AB from the plug-in area SB. The connection area AB of the contact support 2 is enclosed by a seal 10. The seal 10 is pushed up to the end surface of the collar 7 over the contact support 2. The housing 8 of the plug-in connector 1 exerts a force onto the end face of the collar 7, as a result of which the seal 10 is pressed between the collar 7 and the housing 8. As a result, the contact support 2 is sealed against the housing 8.

The seal 10 has substantially a hose-like shape, which hose shape narrows down in the direction of the connected cable 6. In the direction of the contact support 2, the seal 10 comprises a circumferential lip 9. The lip 9 is part of the seal 10 that is pressed between the collar 7 of the contact support 2 and the end face of the housing 8.

In the direction of the narrowing, the seal has two circumferential webs 11, 12 that are parallel to each other and enclose a fixing region 13. A cable tie, for example, is fixed around the fixing region 13 so that the seal is pressed onto the cable sheath of the cable 6. As a result, a cable seal is realised.

As a rule, the contact elements 3 in the contact support 2 are also individually sealed. However, the main seal of the plug-in connector is achieved by clamping the first end of the seal 10 between the contact support 2 and the housing 8 of the plug-in connector 1, and the second end of the seal 10 is fixed to the connected cable 6 in a sealing manner using fixing means. As a result, the housing 8 does not need to be especially sealed.

As has already been mentioned above, the internal space that is enclosed by the hose-shaped seal (10) fixed on both sides may at least partially be filled with a thermally conductive material, for example with a thermally conductive gel, by which two advantages are achieved at the same time. Firstly, the dissipation of the heat by necessity generated during the charging process is improved. It is possible that this might even accelerate the charging process. Secondly, the components are mechanically protected in the enclosed area by the gel. The gel causes the rubber seal to become slightly convex and serves as an airbag in case the plug-in connector is inadvertently dropped.

Figure 5:
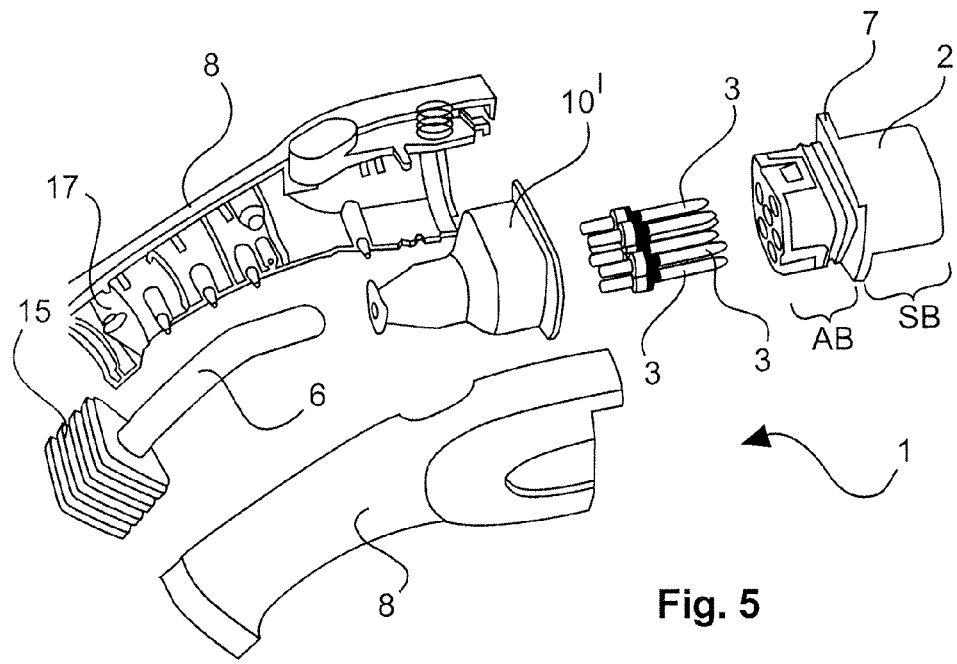
FIG. 5 shows an exploded view of a further embodiment example of a plug-in connector according to the invention.
Figure 6:
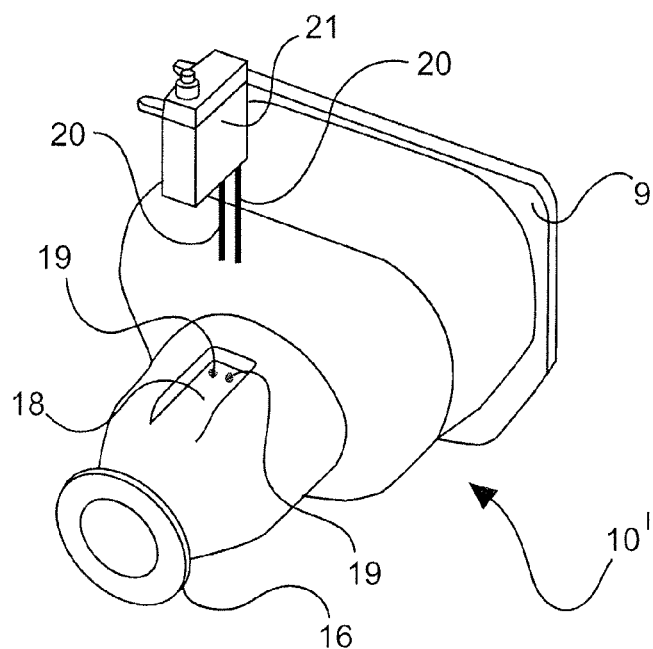
FIG. 6 shows a perspective view of a further embodiment of a seal according to the invention.

FIG. 5 shows an exploded view of a further variant of a car charging connector 1. The cable 6 connected to the plug-in connector is sealed in the region of the housing inlet by a seal 15, in order to protect the housing 8 from the ingress of media such as dust and water.

The lip 9 of the seal 10 is pressed against the circumferential collar 7 of the contact support 2 and thus encloses the connection area AB thereof.

The plug-in region SB protrudes from the housing 8. Accordingly, the contact support 2 is only partially located in the housing 8.

At the other end, the seal 10 comprises a further lip 16 that interacts with fixing means 17 provided in the housing 8 in such a way that the end of the connected cable 6 is enclosed in a sealing manner. The fixing means 17 are for example a so-called hose clip. The fixing means 17 may also simply serve as a cable strain relief.

The seal 10' may also have a recess 18 with two holes 19 therein moulded into it. Each of the holes 19 is used as a feedthrough for a cable 20 of a microswitch 21. The shape of the recess 18 is adapted to the shape of the microswitch 21. The microswitch 21 is also provided in the plug-in connector housing 8. The function of the microswitch 21 will not be described in any more detail below because it is not relevant to the invention. Instead of a microswitch 21, also another electronic component might be provided.

LIST OF REFERENCE NUMERALS

1 Plug-in connector
2 Contact support
  AB connection area
  SB Plug-in area
3 Contact element
  3a Connection part
4 Retention arm
5 Thickening
6 Cable
7 Collar
8 Housing
9 Lip
10, 10' Seal
AB Connection area
SB Plug-in area 11. Web
12. Web
13. Fixing region
14. Conductor
15. Seal
16. Lip
17. Fixing means
18. Recess
19. Hole
20. Cable
21. Microswitch The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A plug-in connector, comprising
    a contact support having an enclosed circumferentially extending wall, said contact support supporting at least one contact element, said at least one contact element connected to a conductor of a connected cable,
    wherein said contact support has a circumferential collar extending around the circumferentially extending wall to separate the contact support into a connection area (AB) and a plug-in area (SB),
    and wherein said connected cable protrudes into a housing of the plug-in connector,
    said plug-in connector including a circumferentially extending hose-shape seal having a first end and a second end wherein the first end of the seal is clamped between the circumferential collar of the contact support and the housing, and the second end of the seal is pressed and sealed onto the part of the cable that protrudes into the housing, whereby said seal encloses and seals at the same time the connection area (AB) of the contact support and a section of the cable that protrudes into the housing.

2. The plug-in connector according to claim 1, characterised in that
    said second end of the seal is fixed to the part of the cable that protrudes into the housing of the plug-in connector using a fixing structure.

3. The plug-in connector according to claim 2, characterised in that
    the fixing structure is a cable tie.

4. The plug-in connector according to claim 2, characterised in that
    the fixing structure is a rubber clamp.

5. The plug-in connector according to claim 1, characterised in that
    the contact support supports two or more contact elements.

6. The plug-in connector according to claim 1, characterised in that
    the contact support includes a circumferential groove adjacent said circumferential collar into which the first end of the seal engages.

7. The plug-in connector according to claim 1, characterised in that
    the internal space that is enclosed by the hose-shaped seal that is fixed on both sides is at least partially filled with a thermally conductive material.

8. The plug-in connector according to claim 1, characterised in that
    the seal has a recess, and
    the recess contains at least one feedthrough for a cable.

* * * * *